April 14, 1970 W. B. PENNEBAKER, JR 3,506,506

CAPACITOR DEFECT ISOLATION

Filed July 14, 1967

*INVENTOR.*
WILLIAM B. PENNEBAKER, JR.

BY
Thomas J. Kilgannon Jr.
ATTORNEY

United States Patent Office 3,506,506

Patented Apr. 14, 1970

3,506,506
CAPACITOR DEFECT ISOLATION

William B. Pennebaker, Jr., Putnam Valley, N.Y., assignor to International Business Machines Corporation, Armonk, N.Y., a corporation of New York Filed July 14, 1967, Ser. No. 653,394
Int. Cl. C23f *1/02*
U.S. Cl. 156—3 8 Claims

ABSTRACT OF THE DISCLOSURE

A process for isolating short-circuiting defects between dielectrically spaced metallic layers of a capacitive device, for example, which is accomplished by applying an etch resistant medium to the surface of one of the metallic layers to replicate the defect in the medium and then immersing the device in an etchant for the metallic layer for a time sufficient to remove the metal in the region of the defect. Media which replicate the defects include such materials as photoresists which have utility in the further processing of devices. Etchants, of course, depend upon the metal being utilized and well-known etchants may be used.

BACKGROUND OF THE INVENTION

Field of the invention

This invention relates generally to a process for selectively etching metals. More specifically, it relates to a process for etching metals in the region of short-circuiting defects between dielectrically spaced metallized layers of a thin film capacitor, for instance. The capacitors resulting from the process of this invention still contain the short-circuiting defects but these defects have been effectively isolated such that from an electrical point of view the capacitors are prefect. Thin film capacitors and metallic interconnection lines separated by an insulating material, often utilized in the integrated circuit environment, are examples of areas where processes like the present invention make the manufacture of advanced design integrated circuits economically feasible.

Description of the prior art

There is little prior art of significance which relates to the isolation of short-circuiting defects in devices which are made up of extremely thin metal layers separated by a thin layer of insulating or dielectric material. The problem does not arise in grosser devices where the insulating layer is of sufficient thickness so that defects which are present do not extend through the insulating layer. The use of etch resistant materials is, of course, well known and, along with this, etchants for the metals which the resistant materials protect are also well known. There is, however, no known prior art which deals with the isolation of a plurality of randomly disposed microscopic defects any of which are capable in the unisolated condition of rendering a capacitor, for example, inoperable.

SUMMARY OF THE INVENTION

The process of the present invention, in its broadest aspects comprises the steps of applying an etch resistant medium to the surface of one of the metallic layers of a device consisting of two dielectrically spaced metallic layers in an amount sufficient to replicate or delineate a short-circuiting defect in the medium and then immersing the device in an etchant for a time sufficient to remove metal only in the region of the defects.

In accordance with a more particular aspect of the invention, the process is directed to the isolation of short-circuiting defects within devices which consist essentially of insulation spaced metallic layers such as are found in thin film capacitors. It is, of course, obvious that a short-circuiting defect ruins a capacitor and that such defects cannot be tolerated. The resulting defects are microscopic in size and do not occur according to any recognizable pattern. Because of their random occurrence and because their presence is most deleterious as devices get smaller and smaller, these defects should be completely eliminated or, if this is not possible, the effect of their presence should be controlled. The present invention teaches a method whereby the effect of the presence of short-circuiting defects is completely controlled. The short-circuiting effect of defects in thin film capacitive devices and the like is controlled by the process of the present invention by delineating the defects with a masking material and isolating the defects using a selective etching step.

A device consisting of metallic layers separated by an insulating material layer containing short-circuiting defects is processed in the following manner:

An etch resistant medium is deposited on one of the metallic layers in a thickness sufficient to replicate or delineate underlying defects. As a practical matter, the thickness of the medium should not exceed the height of the deformation of a metallic layer resulting from the presence of a defect. The etch resistant medium, a positive photoresist, for example, may then be heat treated by baking to enhance its etch resistant qualities. At this point, an etchant for the metal of the metllized layer is applied and etching is allowed to take place for a time sufficient to remove the metal down to the dielectric or insulating layer. In this manner, the short-circuiting path from the lower metal layer through the defect to the upper metal layer is interrupted and electrically isolated. One indication that isolation of the defects has been accomplished is the amount of undercutting of the upper metal layer of the device being processed. When the amount of undercutting exceeds the thickness of the metal layer, by approximately 25 times the thickness, the etchant will have removed the desired amount of metal in the region of the defect and, without directly checking each defect, it is certain that the great majority of defects are isolated.

It is, therefore, an object of the present invention to provide a process which eliminates short-circuiting defects between dielectrically spaced metallized layers.

Another object is to provide a process which substantially increases the yield of devices subject to short-circuiting defects over the yield obtainable when the process of the present invention is not utilized.

Another object is to provide a process which eliminates short-circuiting defects by simple delineating and etching steps.

Still another object is to provide a process which isolates short-circuiting defects between dielectrically spaced metallized layers which is simple, economic, and requires no special instrumentation.

The foregoing and other objects, features and advantages of the invention will be apparent from the following more particular description of a preferred embodiment of the invention as illustrated in the accompanying drawings.

DESCRIPTION OF A PREFERRED EMBODIMENT

Figure 1:
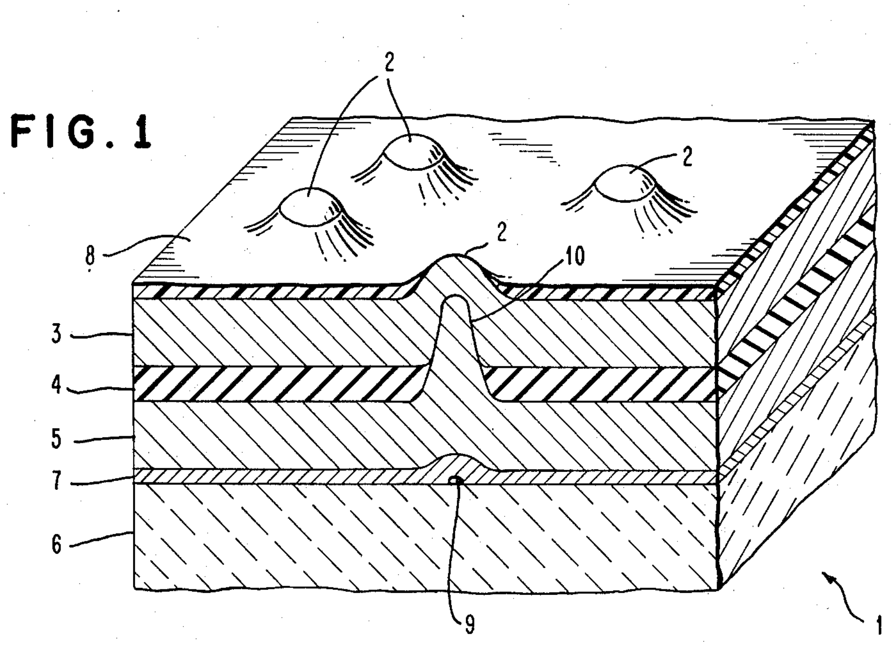
FIG. 1 is a cross-sectional perspective view of a thin film capacitor showing the presence of a short-circuiting defect and the deformation of the upper metallic layer by the defect. An etch resistant medium which replicates or delineates the defects is also shown.

In accordance with a preferred embodiment of the process of this invention, the isolation of short-circuiting defects between insulation spaced metallic layers can be accomplished by following the detailed steps outlined hereinbelow. It should be appreciated that the process of the present invention can be applied to any generalized thin film dielectric structure having metallization on both sides thereof because, it is in the thin film environment that the presence of defects results in short circuit paths between the metallized layers. The defect problem is particularly significant in the manufacture of thin film capacitors where, in spite of "clean room" techniques and careful handling, defects can appear which ruin the structure as a capacitor. The cause of the defects is not completely understood but, it is believed that they result from random deposition of dust particles or the like on the surface of substrates about which defects nucleate and grow larger as the layers of metallization and dielectric are deposited to form the capacitor structure. It is significant that, in spite of affirmative cleaning steps such as ion etching for a period of time prior to deposition of metallization, defects still appear in the resulting structure. It is also significant and indicative of the randomness of the appearance of these defects that individual devices can be made which are completely free of defects. The process of the present invention if applied on an individual device basis would, of course, be operable but it should be appreciated that the process is only economically feasible where large number of devices which may contain defects are being manufactured. In the mass production regime, the improvement is in the area of yield. For example, where the technique of the present invention is not practiced, yields up to 50% may be expected, but such yields are economically prohibitive. Using the technique of the present invention yields of close to 100% can be attained with only minor changes in the usual process for forming such capacitors. Referring now to FIG. 1, there is shown a cross-sectional perspective view of a thin film capacitor 1 which contains a number of defects as indicated by deformations 2 in upper metallized layer 3. Layer 3 may be any metal but for purposes of illustration is preferably copper. The remainder of capacitor 1 consists of a dielectric layer 4 which may be any insulating material but is preferably strontium titanate and a lower metallized layer 5 which may be any metal but, for purposes of illustration, is preferably gold. Layer 5 is bonded to an insulating substrate 6 which may be any insulating material but is preferably silicon dioxide by a thin metal layer 7 such as molybdenum which is often provided to provide good adhesion between substrate 6 and lower metallized layer 5. A layer 8 of etch resistant material is shown disposed on the surface of upper metallized layer 3. Layer 8 replicates, delineates or deforms in accordance with the deformation of layer 3 which results from the presence of a dust particle or the like on substrate 6 about which the deposited metals nucleate to form a short circuiting defect. In FIG. 1, a particle 9 is shown disposed on the surface of substrate 6. Upon deposition of metal layer 7 the defect is enlarged because of nucleation of metal about particle 9. When lower metallized layer 5 is deposited, the original defect is further enlarged to form a spike of metal 10, which extends through the later deposited layer 4 to contact layer 5. Layers 5 and 3 are now electrically short-circuited and the capacitor is rendered ineffective for any purpose. It is, at this point, that the technique of the present invention is applied to render what was formerly a defective device operative.

Layer 8 of etch resistant material may be any material which is resistant to metal etchants but for purposes of illustration it is preferably a photoresist which are widely known for their etch resistant qualities. Specifically, a positive photoresist known as Shipley Resist-AZ 1350 which is commercially available is preferably used because in addition to acting as an etch resist it may be used in a subsequent step to delineate patterns in upper metal layer 3. Layer 8 in FIG. 1 is formed by placing a small amount of photoresist on the surface of layer 3 and spinning capacitor 1 by means well known to those skilled in the art until the resist spreads into a thin layer. The thickness of layer 8 preferably should not exceed the height of the deformations 2 on the surface of upper metallized layer 3. The thickness of layer 8, for practical applications, is preferably less than the height of the deformations 2 and may be reduced in thickness to a point where the layer just maintains its etch resistance. In no case, however, should the thickness of layer 8 be so great that deformations 2 are not replicated or delineated in layer 8. After depositing layer 8, capacitor 1 is placed in an oven and baked at 110° C. for 10 minutes to enhance the etch resistant qualities of layer 8. At this point, capacitor 1 is immersed in or exposed to the action of an etchant which attacks the metal of layer 3. For copper, the etchant is preferably a solution of nitric acid consisting of three parts $HNO_3$ to three parts water. This solution has a rather high concentration but concentration does not appear to be critical and is a practical concentration if reasonable etching times are sought. For any given concentration, however, the time of etching is critical in that the time required to remove metal in the region of a defect is significantly longer than is required to remove the same thickness of metal at the edge of capacitor 1, for example. This can be seen from a consideration of FIG. 2 which shows a cross-sectional perspective view of a thin film capacitor after it has been subjected to the action of an etchant for a time sufficient to remove metal in the region of the defect only. The action of the etchant has attacked the metal of layer 3 in the vicinity of metal spikes 10 leaving crater-like apertures 11 in the surface of layer 3 which extend down to dielectric or insulating layer 4. Typical values of thickness for the various layers are as follows:

| | Thickness A. |
|---|---|
| Upper metallic layer **3** | 5,000–10,000 |
| Lower metallic layer **5** | 5,000–10,000 |
| Bonding layer **7** | 1,000–2,000 |
| Dielectric layer **4** | 2,500 |

A typical capacitor may have a surface area of 30 x 30 mils and provide a capacitance of 4,000–5,000 picofarads at 100 kc.

Considering the thickness of layer 3 (5,000–10,000 A.), it has been found that using the etchant concentration mentioned hereinabove, that lateral etching of layer 3 along the interface between layers 3 and 8 proceeds approximately 5 times faster than the etching through layer 3. Thus, in the time required to etch vertically through 5,000 A. of layer 3 in the vicinity of a defect, lateral etching occurs to a radius of approximately 0.1 mil around the defect. This is an undercutting action and is shown for purposes of illustration in FIG. 2 by dotted line 12. Since dielectric layer 4 acts as a mask for lower metallic layer 5, etching action can only extend laterally and as far as thickness removal of layer 3 is concerned the action is self-limiting. The measurement of undercutting of metal layer 3 provides a practical way of measuring when isolation of defects is completed. The amount of undercutting can, of course, be correlated with the different etchants and concentrations required for various metals. Isolation of the defects can, of course, be determined by optical inspection and, while this is more accurate, it is also more time consuming and expensive. A typical range of undercutting values for the devices shown is in the range of 0.1–0.5 mil with the latter value being used where there is a high density of defects.

Referring again to FIG. 2, metal spike 10 which resulted from the presence of particle 9, was not removed by the action of the etchant because lower metal layer 5 was preferably shown as gold. Where layer 5 is the same as layer 3 (copper) metal spike 10 would have been attached and substantially removed. The appearance of spike 10 is only characteristic of situations where it is composed of a metal different from that in layer 3 and is not attacked by the etchant used.

Figure 2:
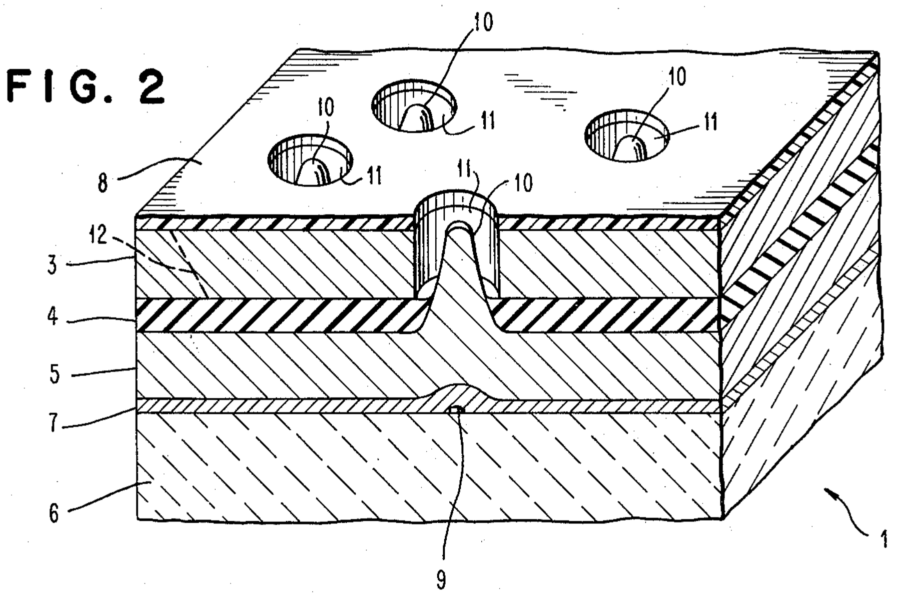
FIG. 2 is a cross-sectional perspective view of a thin film capacitor showing the final appearance of a thin film capacitor after it has been subjected to the process of the present invention.

In FIGS. 1 and 2, it should be appreciated that the vertical dimensions are relatively to scale but that, for the sake of illustrating the invention clearly, the horizontal dimensions of craters 11 have been compressed and are not to scale. If spike 10 is assumed to be to scale, the diameter of craters 11 would be approximately three times larger.

With respect to the size of the deformation of layer 7 about particle 9, the deformation may have a width of approximately 3 microns and the height of deformation 2 in FIG. 1 is approximately 0.5 micron. The thickness of layer 8 when it appears as a positive resist may vary between 0.1–.2 micron and reliaby provide isolation of short circuiting defects.

The precise mechanism whereby etching proceeds selectively at the defects is not fully understood but it is believed that the 1 deformation of the masking material resulting from the defects weakens or disrupts the etch resistance of the material only at the deformations. As a result, the etchant acts selectively in the weakened areas while the remainder of the surface is unaffected.

The technique disclosed hereinabove has certain definite advantages in that it permits the use of masking materials all of which are self-delineating of the defects which are randomly disposed within a device. In the prior art, a masking material for an etchant, if it is not a photoresist, must itself be masked to remove certain areas so that underlying areas may be attacked by a different etchant. In the present case, this approach is clearly impossible because of the random distribution and microscopic size of the deformations which indicate the presence of a defect. Where the masking material is a photoresist, the prior art requires that areas to be etched be delineated by exposing the resist to a predetermined pattern and, while present techniques could deal with areas of extremely small size, there is no way of defining these areas for removal in the present case because of the randomness of their distribution. The present technique is, therefore, different from the prior art in that the masking material provided is used in thicknesses which permit the masking material to be self-delineating; a step which eliminates the necessity for prior delineation by etching or exposure to light and development and which results in devices which contribute to the advancement of the integrated circuitry art. This process also has the advantage that only a small amount of the total surface area of the capacitor is removed by the etching action leaving the overall value of capacity substantially unaffected.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A process for isolating short-circuiting defects between insulation spaced metallic layers the presence of said defects being indicated by deformations in one of said metallic layers which includes the step of:

depositing a coating of an etch resistant material on the surface of said one of said metallic layers in a thickness of approximately the height of said deformations and then applying an etchant to the surface of said etch resistant material for a time sufficient to remove at least a portion of said metallic layers in the region of said deformations to isolate said defects electrically.

2. A process according to claim 1 wherein the step of depositing an etch resistant material in a thickness of approximately the height of said deformations includes the step of:

depositing an etch resistant material on the surface of said one of said metallic layers in a thickness which is slightly greater than the height of said deformations.

3. A process according to claim 1 wherein the step of depositing an etch resistant material in a thickness of approximately the height of said deformations includes the step of:

depositing an etch resistant material on the surface of said one of said metallic layers in a thickness which is equal to the height of said deformations.

4. A process according to claim 1 wherein the step of depositing an etch resistant material in a thickness of approximately the height of said deformations includes the step of:

depositing an etch resistant material on the surface of said one of said metallic layers in a thickness which is less than the height of said deformations.

5. A process according to claim 1 wherein said etch resistant material is an etch resistant photoresist.

6. A process according to claim 1 wherein said etch resistant material is an etch resistant positive photoresist.

7. A process according to claim 1 wherein the step of depositing a coating of an etch resistant material includes the steps of:

applying a photoresist in liquid form to the surface of said one of said metallic layers spinning said insulation spaced metallic layers to form a coating which replicates said deformations and baking said photoresist to enhance its etch resistant qualities.

8. A process according to claim 1 wherein the height of said deformations is approximately 0.5 micron and less.

References Cited

UNITED STATES PATENTS 3,438,809 4/1969 Kaveggia et al. ---- 156—17 XR

JACOB H. STEINBERG, Primary Examiner

U.S. Cl. X.R.

29—574, 575; 156—13, 17; 96—38.4